United States Patent Office 3,039,251
Patented June 19, 1962

3,039,251
PRODUCTS AND PROCESS FOR PURIFYING GASES
Jonas Kamlet, New York, N.Y., assignor to El Paso Natural Gas Products Company, El Paso, Tex., a corporation of Texas
No Drawing. Filed Oct. 2, 1959, Ser. No. 843,914
15 Claims. (Cl. 55—29)

This invention relates to a series of products and a process for the purifying of gases. More particularly, this invention relates to a series of products and a process for the joint and simultaneous removal of water, hydrogen sulfide, mercaptans and carbon dioxide from natural and synthetic gas and gas mixtures, such as natural gas, petroleum and gasoline refinery gases, coal gas, water gas, synthesis gas, producer gas, coke oven gas, pipeline gases, et cetera. These gases consist essentially of hydrocarbons, hydrogen, carbon monoxide, nitrogen and mixtures thereof.

A tremendous technology has developed and many hundreds of patents have issued to the present time, describing a multiplicity of products and processes which effect the dehydration of such gases, the removal of hydrogen sulfide, the removal of mercaptans and the removal of carbon dioxide therefrom. In almost all cases, individual reagents and usually separate treating processes are required to effect these results.

The basis of my invention is the finding that simultaneous removal of water (i.e. dehydration), removal of hydrogen sulfide, removal of mercaptans and removal of carbon dioxide from gases may be effected by contacting said gases with at least one member of the group of compounds of the general formula:

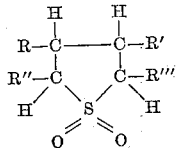

where R, R', R" and R''' are members of the group consisting of hydrogen and methyl.

Compounds of this type are readily prepared by the hydrogenation of the sulfones obtained by the reaction of conjugated drenes of composition

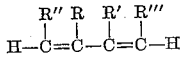

with sulfur dioxide. Typical members of this group of composition, suitable for use in the process of this invention are (a) Tetrahydrothiophene-1,1-dioxide (derived from butadiene sulfone), M. Pt. 26°, B. Pt. 110° C. at 3 mm. Hg, 285° C. at 760 mm. Hg.

(b) 3 - methyltetrahydrothiophene-1,1- dioxide (derived from isoprene sulfone), M. Pt. minus 5° C., B. Pt. 133° C. at 6 mm. Hg, 290 C. at 760 mm. Hg.

(c) 2 - methyltetrahydrothiophene -1,1- dioxide (derived from piperylene sulfone), B. Pt. 279°–280° C./760 mm.

(d) 2,5 - dimethyltetrahydrothiophene -1,1- dioxide (derived from hexadiene-2,4 sulfone), B. Pt. 278°–280° C./760 mm.

(e) 3,4 - dimethyltetrahydrothiophene -1,1- dioxide (derived from 2,3-dimethylbutadiene sulfone), B. Pt. 274°–275° C./760 mm.

Methods for the synthesis of these compounds are described by Backer and Bolt, Rec. Trav. Chem. 54, 538–44 (1935); de Roy and van Zuydewijn, Rec. Trav. Chem. 57, 445–455 (1938); Farlow) (to du Pont), U.S. Patent 2,233,999 (1941); I. G. Farbenindustrie, French Patent 847,254 (1939); Evans, Morris and Shokal (to Shell), U.S. Patents 2,360,859 to 2,360,862 (1944); Morris and Van Winkle (to Shell), U.S. Patent 2,435,404 (1948), and elsewhere.

For simplicity, the compounds above described will be referred to in this specification by the following abbreviations:

THTD—tetrahydrothiophene-1,1-dioxide
3-MTHTD—3-methyltetrahydrothiophene-1,1-dioxide
2-MTHTD—2-methyltetrahydrothiophene-1,1-dioxide
2,5-DMTHTD—2,5 - dimethyltetrahydrothiophene-1,1-dioxide
3,4-DMTHTD—3,4 - dimethyltetrahydrothiophene-1,1-dioxide The presence of water, water vapor or moisture in many gases, especially such gases as are transported through pipelines over considerable distances (such as natural gas, pipeline gas, etc.) is highly undesirable. There is a tendency for crystalline hydrates to form with some of the components of said gases, which may clog or otherwise inhibit the free flow of the gases. In addition, the higher the moisture content of said gases, the greater will be the corrosivity of these gases on the exposed metallic parts of the pipeline.

The tetrahydrothiophene-1,1-dioxide and the homologues thereof, above described, are highly hygroscopic and will effectively remove the moisture content of gases with which these agents are contacted. Typical vapor pressures of such compounds may be given by the following table.

TABLE I

Vapor Pressures of THTD

| Temperature, °C. | Pressure—mm. Hg |
|---|---|
| 120 | 20 |
| 156 | 30 |
| 173 | 50 |
| 194 | 100 |
| 210 | 150 |
| 223 | 198 |
| 230 | 201 |

The boiling points of typical mixtures of such compounds and water may be given by the following table.

TABLE II

Boiling Point of Aqueous Solutions of THTD at 664 mm.

| Percent water by volume: | Boiling Point |
|---|---|
| 5 | 142.2 |
| 15 | 108.4 |
| 30 | 100.0 |

This demonstrates the relative ease with which such solutions, after having absorbed water from gases with which they have been contacted, can be regenerated by distilling off the said water.

The technic of gas dehydration by the use of liquid absorbents for moisture is very well known. As a rule, concentrated solutions of said liquid absorbents are passed countercurrent to the gas being dried down through the contractor, and then through a heat exchange unit to a regenerator where the water removed from the gas is distilled off, usually under reduced pressure.

The performance of the tetrahydrothiophene-1,1-dioxide absorbents of this invention may be judged by the depression of the dew points of a typical natural gas treated by the well known procedure of the art. The following table describes the result observed in the treatment of a wet natural gas, at different pressures.

TABLE III

| Absorbent | Contact Pressure, p.s.i.g. | Wet Gas, °F. | Absorbent Rate, Gal./lb. Water Content | Dew Point Depression, °F. |
|---|---|---|---|---|
| THTD | 500 | 86 | 3.2 | 62 |
| THTD | 500 | 82 | 6.4 | 72 |
| THTD | 500 | 84 | 9.6 | 84 |
| THTD | 750 | 86 | 6.4 | 71 |
| THTD | 1,000 | 86 | 6.4 | 78 |
| 3-MTHTD | 500 | 85 | 6.4 | 70 |
| 2-MTHTD | 500 | 86 | 6.4 | 69 |
| 2,5-DMTHTD | 500 | 86 | 6.4 | 71 |
| 3,4-DMTHTD | 500 | 85 | 6.4 | 70 |

It is not intended in any way to limit this invention in any manner to a specific procedure for the dehydration of gases by the compounds above described, or of regenerating the said absorbent solutions. Any of the technics well known in the art may be employed. As a rule, the use of these compounds, in concentrations between 95.0% and 99.5% by weight, at contact temperatures with the gases of from 50° F. to 110° F. will produce dew point depressions of between 45° F. and 105° F.

A 7 lb. gas (i.e. a gas containing not more than 7 lbs. of water per million standard cubic feet) is usually required for pipeline transmission. Such a gas can be produced with a 65° F. dew point depression under the conditions given in the following table.

TABLE IV

| Absorber pressure, p.s.i.a.: | Contact temperature, °F. |
|---|---|
| 200 | 68 |
| 400 | 80 |
| 600 | 88 |
| 800 | 93 |
| 1000 | 97 |
| 1200 | 102 |
| 1400 | 104 |

After the gas has been dehydrated to the required extent, it may be freed of its water content by any of the well known procedures of the art, e.g. by distilling off the water at atmospheric pressure, or by vacuum regeneration (e.g. by distilling off the water under reduced pressures of 50 to 400 mm. Hg).

Technics for the dehydration of gases by liquid moisture absorbents are described in detail in the report on "Gas Purification" appearing in Chemical Engineering for June 15, 1959, and in the Proceedings of the Gas Conditioning Conference for 1957 (University of Oklahoma).

The tetrahydrothiophene-1,1-dioxide compounds of this invention are also excellent agents for the removal of hydrogen sulfide from gases. The following table describes the absorption of hydrogen sulfide in a typical compound of this series.

TABLE V

*Absorption of $H_2S$ in THTD at 664 mm. Hg at 80° F.*

| Percent $H_2S$ in nitrogen | Gaseous ml. $H_2S$ absorbed per liquid ml. THTD |
|---|---|
| 1.7 | 0.30 |
| 4.0 | 0.51 |
| 8.6 | 1.15 |
| 11.8 | 1.54 |
| 16.7 | 2.56 |
| 100.0 | 13.70 |

*Absorption of $H_2S$ in 3-MTHTD at 760 mm. Hg at 80° F.*

| Percent $H_2S$ in methane | Gaseous ml. $H_2S$ absorbed per liquid ml. 3-MTHTD |
|---|---|
| 5.0 | 1.07 |
| 25.0 | 3.80 |
| 50.0 | 7.20 |
| 100.0 | 14.10 |

The absorption of hydrogen sulfide by typical tetrahydrothiophene-1,1-dioxide compounds of this series was also determined at advanced pressures, using mixtures of $H_2S$ and nitrogen. The following results were obtained.

TABLE VI

*Absorption of Hydrogen Sulfide by Tetrahydrothiophene Dioxide*

| Test No. | 1 | 2 | 3 | 4 | 5 |
|---|---|---|---|---|---|
| Total p.s.i.a., 60° F., before THTD | 762.9 | 704.3 | 723.5 | 759.8 | 776.9 |
| $H_2S$ p.s.i.a., 60° F., before THTD | 256.4 | 146.8 | 81.0 | 38.7 | |
| Mole percent $H_2S$ (Tutweiler) | 38.43 | 21.50 | 12.25 | 5.91 | 0.95 |
| ml. THTD | 90 | 70 | 50 | 100 | 100 |
| Calc. Total p.s.i.a., 60° F. | 841.1 | 759.2 | 762.9 | 84.74 | 866.4 |
| Calc. $H_2S$ p.s.i.a., 60° F. | 282.7 | 158.2 | 85.4 | 43.2 | |
| Total p.s.i.a., 60° F., after absorption | 705.4 | 694.1 | 727.0 | 816.4 | 858.5 |
| $H_2S$ p.s.i.a., 60° F., after absorption (Calc.) | 147.0 | 93.1 | 49.5 | 12.2 | |
| Mole percent $H_2S$ after absorption (Tutweiler) | 19.5 | 11.9 | 7.17 | 3.41 | 0.45 |
| ml. $H_2S$ absorbed/ml. THTD by gage | 90 | 57 | 45 | 18 | |
| ml. $H_2S$ absorbed/ml. THTD by mole percent | 123 | 70 | 52 | 13 | 2.6 |
| Moles $H_2S$/mole THTD by gage | 0.362 | 0.228 | 0.180 | 0.074 | |
| Moles $H_2S$/mole THTD by mole percent | 0.495 | 0.282 | 0.207 | 0.053 | 0.010 |

The tetrahydrothiophene-1,1-dioxide compounds of this invention are also excellent agents for the removal of mercaptans from gases. The following table describes the mercaptan absorbing capacity of a typical compound of this group. A gas mixture of methyl mercaptan in nitrogen was employed.

TABLE VII

| $CH_3SH$ Content in nitrogen per 100 s.c.f. | Pressure, p.s.i.a. | Absorbent | $CH_3SH$ Content after Absorption, grams | Capacity of Absorbent ml. mercaptan per ml. liquid absorbent |
|---|---|---|---|---|
| 12.58 grams | 967 | THTD | 5.32 | 0.08 |
| 14.10 grams | 84 | THTD | 3.15 | 0.06 |

The ability of the tetrahydrothiophene-1,1-dioxide compounds of this invention to remove carbon dioxide from gas streams may be judged by the results reported in the following table:

TABLE VIII

Absorption of Carbon Dioxide by Tetrahydrothiophene Dioxide

| Test No | 1 | 2 | 3 | 4 | 5 | 6 | 7 | 8 | 9 |
|---|---|---|---|---|---|---|---|---|---|
| Total p.s.i.a. before THTD | 718.7 | 719.1 | 710.5 | 716.7 | 701.1 | 708.3 | 737.1 | 682.9 | 964.1 |
| $CO_2$, p.s.i.a. before THTD | 26.4 | 42.6 | 84.9 | 156.3 | 205.6 | 258.1 | 381.9 | 533.1 | 781.9 |
| Mole percent $CO_2$ | 3.2 | 5.8 | 11.0 | 21.4 | 28.4 | 37.2 | 52.9 | 80.5 | 86.0 |
| Ml. THTD Added | 100.00 | 100.00 | 100.00 | 100.00 | 100.00 | 100.00 | 100.00 | 100.00 | 100.00 |
| Calc. Total p.s.i.a | 801.5 | 802.0 | 792.4 | 799.3 | 781.9 | 789.9 | 822.1 | 761.1 | 1,075.2 |
| Calc. $CO_2$ p.s.i.a | 29.4 | 47.5 | 94.7 | 174.3 | 229.3 | 287.8 | 425.9 | 594.5 | 872.0 |
| Total p.s.i.a. After Absorption | 786.6 | 790.5 | 771.2 | 763.4 | 743.9 | 742.1 | 731.9 | 660.1 | 944.9 |
| $CO_2$ p.s.i.a. After Absorption | 14.5 | 36.0 | 73.5 | 138.4 | 191.3 | 240.0 | 335.7 | 493.0 | 741.7 |
| Mole percent $CO_2$ After Absorption | 2.5 | 4.5 | 9.1 | 18.0 | 24.3 | 32.1 | 48.0 | 76.7 | 82.2 |
| Ml. $CO_2$ absorbed/ml. THTD by gage | 8.8 | 6.8 | 12.5 | 21.2 | 22.4 | 28.2 | 53.2 | 59.9 | 76.9 |
| Ml. $CO_2$ absorbed/ml. THTD by mole percent | 3.5 | 6.5 | 10.0 | 19.8 | 24.4 | 32.8 | 49.4 | 62.9 | 87.3 |
| Moles $CO_2$/mole THTD by gage | 0.035 | 0.027 | 0.050 | 0.085 | 0.090 | 0.113 | 0.213 | 0.240 | 0.308 |
| Moles $CO_2$/mole THTD by Mole percent | 0.014 | 0.026 | 0.040 | 0.079 | 0.098 | 0.131 | 0.198 | 0.252 | 0.350 |

All pressures are at 60° F.
All volumes are at 60° F. and 760 mm. Hg.
The internal volume of the absorption vessel was 967.6 ml.
Mole percent $CO_2$ determined by gas analysis (Orsat).

In all cases, the homologous compounds of the series of this invention, i.e. THTD, 3-MTHTD, 2-MTHTD, 2,5-DMTHTD and 3,4-DMTHTD exhibit closely similar solubilities for hydrogen sulfide, methyl mercaptan and other mercaptans and carbon dioxide, and are almost equally as efficient in the removal of water and the depression of the dew point of said gases.

It should be understood that the tetrahydrothiophene-1,1-dioxide and its homologues may be used by themselves, or in admixture with each other, in the purification of gases. These may also be used in conjunction with other agents now extensively employed in the purification of gases, such as diethylene glycol, triethylene glycol, propylene carbonate, monoethanolamine, diethanolamine, N-methyldiethanolamine, alkazid (alpha aminoproprionic acid) et cetera.

It must be appreciated that the products of this invention may be used for the purifying of gases over a very wide range of temperatures, pressures and compositions. It is not intended to limit this invention in any manner to any specific temperature or temperature range, any specific pressure or range of pressures or any specific gas, composition of gas or concentration of components in said gas. The products of this invention may be used for the purifying of gases under all of the conditions heretofore employed with other agents for the removal of moisture, dehydration, removal of hydrogen sulfide, mercaptans and carbon dioxide from said gases.

The following examples are given to define and to illustrate this invention but in no way to limit it to reagents, proportions or conditions described therein. Obvious modifications and improvements will occur to persons skilled in the art.

EXAMPLE I

A natural gas containing 8.2% carbon dioxide and 4.8% hydrogen sulfide (by volume) was contacted at a flow rate of 7.5 cu. ft. per hour with the following compounds of this invention, the latter at a flow rate of 1.0 gal. per hour. The results obtained were as follows:

| Absorbent | Outlet Gas, $CO_2$, percent | $H_2S$-grains per 100 s.c.f. | Dew Point Depression, °F. |
|---|---|---|---|
| THTD | 2.1 | 4.2 | 84 |
| 3-MTHTD | 3.4 | 5.0 | 78 |
| 2-MTHTD | 2.9 | 7.1 | 80 |
| 2,5-DMTHTD | 3.6 | 6.0 | 68 |
| 3,4-DMTHTD | 2.8 | 5.8 | 72 |
| 15% monoethanolamine 85% THTD | 0.1 | 2.9 | 80 |
| 20% triethanolamine 80% THTD | 0.1 | 3.0 | 75 |
| 20% N-Methylethanolamine 80% 3-MTHTD | 0.1 | 2.6 | 81 |

EXAMPLE II

A natural gas, at a contact pressure of about 750 p.s.ig. was contacted with a mixture of 80% of the various tetrahydrothiophene-1,1-dioxide compounds of this invention, 15% of diethanolamine and 5% of water. The flow rate of the inlet gas was 800 s.c.f. per hour and the treating solution flow rate was about 1.0 gal./min. The inlet gas contained 9.2% carbon dioxide and 2.6% of hydrogen sulfide. The treated gas analyzed as follows:

| Absorbent | $CO_2$, Percent | $H_2S$ grains per 100 s.c.f. | Dew Point Depression, °F. |
|---|---|---|---|
| THTD | 4.4 | 1.2 | 76 |
| 3-MTHTD | 5.6 | 1.6 | 80 |
| 2-MTHTD | 4.7 | 0.9 | 84 |
| 2,5-DMTHTD | 5.0 | 1.3 | 70 |
| 3,4-DMTHTD | 5.0 | 1.0 | 72 |

EXAMPLE III

A natural gas, at a contact pressure of about 800 p.s.i.g. was contacted with the various tetrahydrothiophene-1,1-dioxide compounds of this invention, in each case as 99% solutions with 1% of water. The flow rate of the inlet gas was 800 s.c.f. per hour and the treating solution flow rate was about 1.0 gal./min. The inlet gas contained 8.8% carbon dioxide and 1.4% of hydrogen sulfide. The treated gas analyzed as follows:

| Absorbent | $CO_2$, Percent | $H_2S$-grains per 100 s.c.f. | Dew Point Depression, °F. |
|---|---|---|---|
| THTD | 5.6 | 2.0 | 84 |
| 3-MTHTD | 5.9 | 2.2 | 80 |
| 2-MTHTD | 5.0 | 1.9 | 82 |
| 2,5-DMTHTD | 5.6 | 2.6 | 83 |
| 3,4-DMTHTD | 5.1 | 2.4 | 80 |

The above gas also contained 11.2 grains per 100 s.c.f. of organically bound sulfur, as methyl mercaptan, ethyl mercaptan, etc. Under the above conditions, the treated gas was freed of its organically bound sulfur to the following extents:

| Absorbent | Organic S Content, grains per 100 s.c.f., Effluent |
|---|---|
| THTD | 3.8 |
| 3-MTHTD | 4.0 |
| 2-MTHTD | 2.9 |
| 2,5-DMTHTD | 4.2 |
| 3,4-DMTHTD | 3.8 |

EXAMPLE IV

A synthesis gas made from coal, analyzing about 6.5% carbon dioxide, 32.5% hydrogen, 50.5% carbon monoxide and 3.5% nitrogen, was contacted at an absorber pressure of about 300 p.s.i.g. with the various tetrahydrothiophene-1,1-dioxide compounds of this invention, at the rate of 2.0 gals. of absorbent per 100 s.c.f. of the raw gas at a temperature of 95° F.

The feed gas contained 450 grains/100 s.c.f. of hydrogen sulfide. The treated gas analyzed as follows:

| Absorbent | $H_2S$-grains per 100 cu. ft. | $CO_2$, Percent |
|---|---|---|
| THTD | 45 | 3.4 |
| 3-MTHTD | 52 | 3.8 |
| 2-MTHTD | 50 | 3.1 |
| 2,5-DMTHTD | 48 | 3.6 |
| 3,4-DMTHTD | 52 | 3.2 |

Having described my invention, what I claim and desire to protect by Letters Patent is:

1. A process for the simultaneous removal of hydrogen sulfide, water, carbon dioxide and mercaptans from gases of the class consisting essentially of hydrocarbons, hydrogen, carbon monoxide, nitrogen and mixtures thereof containing the same as impurities, comprising: contacting said gases with an absorbent containing at least one member of the group of compounds consisting of tetrahydrothiophene - 1,1 - dioxide, 3 - methyltetrahydrothiophene - 1,1-dioxide, 2 - methyltetrahydrothiophene - 1,1 - dioxide, 2,5-dimethyltetrahydrothiophene - 1,1 - dioxide and 3,4 - dimethyltetrahydrothiophene-1,1-dioxide.

2. The process of claim 1 wherein said absorbent also contains an ethanolamine.

3. The process of claim 1 wherein said absorbent also contains an alkylene glycol.

4. The process of claim 1 wherein said absorbent also contains propylene carbonate.

5. The process of claim 1 wherein said absorbent also contains alpha-amino propionic acid.

6. A process for the removal of hydrogen sulfide from gases of the class consisting essentially of hydrocarbons, hydrogen, carbon monoxide, nitrogen and mixtures thereof containing same, comprising contacting said gases with an absorbent containing at least one member of the group of compounds consisting of tetrahydrothiophene-1,1-dioxide, 3 - methyltetrahydrothiophene - 1,1 - dioxide, 2 - methyltetrahydrothiophene - 1,1 - dioxide, 2,5 - dimethyltetrahydrothiophene - 1,1 - dioxide and 3,4 - dimethyltetrahydrothiophene-1,1-dioxide.

7. A process for the removal of carbon dioxide from gases of the class consisting essentially of hydrocarbons, hydrogen, carbon monoxide, nitrogen and mixtures thereof containing same, comprising contacting said gases with an absorbent containing at least one member of the group of compounds consisting of tetrahydrothiophene-1,1-dioxide, 3 - methyltetrahydrothiophene - 1,1 - dioxide, 2-methyltetrahydrothiophene - 1,1 - dioxide, 2,5 - dimethyltetrahydrothiophene - 1,1 - dioxide and 3,4 - dimethyltetrahydrothiophene-1,1-dioxide.

8. A process for the removal of hydrogen sulfide and carbon dioxide from gases of the class consisting essentially of hydrocarbons, hydrogen, carbon monoxide, nitrogen and mixtures thereof containing the same, comprising contacting said gases with an absorbent containing at least one member of the group of compounds consisting of tetrahydrothiophene-1,1-dioxide, 3-methyltetrahydrothiophene-1,1-dioxide, 2 - methyltetrahydrothiophene-1,1-dioxide, 2,5-dimethyltetrahydrothiophene-1,1-dioxide and 3,4-dimethyltetrahydrothiophene-1,1-dioxide.

9. The process of claim 8 wherein said gases are contacted with said absorbent at substantially atmospheric temperature.

10. The process of claim 8 wherein said gases are synthesis gases containing hydrogen and carbon monoxide.

11. The process of claim 8 wherein said gases are hydrocarbon-containing gases.

12. The process of claim 8 wherein said gases also contain moisture and the moisture content is reduced by contacting with said absorbent.

13. The process of claim 8 wherein said absorbent also contains an ethanolamine selected from the group consisting of monoethanolamine, diethanolamine, triethanolamine and N-methyl derivatives of ethanolamine and diethanolamine.

14. A process for the treatment of a wet hydrocarbon gas containing hydrogen sulfide and carbon dioxide as impurities to place said gas in condition for transportation through pipe lines over a considerable distance, comprising contacting said gas with an adsorbent containing at least one member of the group consisting of tetrahydrothiophene-1,1-dioxide, 3-methyltetrahydrothiophene-1,1-dioxide, 2-methyltetrahydrothiophene-1,1 - dioxide, 2,5 - dimethyltetrahydrothiophene-1,1-dioxide and 3,4-dimethyltetrahydrothiophene-1,1-dioxide to remove hydrogen sulfide and carbon dioxide to reduce the moisture content of said gas below about seven pounds per million cubic feet.

15. The process of claim 14 wherein said wet gas is natural gas.

References Cited in the file of this patent

UNITED STATES PATENTS

| 2,177,068 | Hutchinson | Oct. 24, 1939 |
| 2,360,861 | Pierotti et al. | Oct. 24, 1944 |
| 2,385,704 | Hooker et al. | Sept. 25, 1945 |

FOREIGN PATENTS

| 728,444 | Great Britain | Apr. 20, 1955 |